3 Sheets—Sheet 1.

J. W. GRAYDON.

Assignor, by mesne assignments, to THE COAST AND HARBOR DEFENCE COMPANY.

SUBMARINE TORPEDO.

No. 10,526. Reissued Sept. 23, 1884.

Witnesses.
Joseph Sullivan
John E. Elmendorf.

Inventor.
James W. Graydon
by G. H. Fielinghuysen
his atty.

J. W. GRAYDON. 3 Sheets—Sheet 2.

Assignor, by mesne assignments, to THE COAST AND HARBOR DEFENCE COMPANY.

SUBMARINE TORPEDO.

No. 10,526. Reissued Sept. 23, 1884.

Witnesses.
Joseph Sullivan
John E. Elmendorf

Inventor.
James W. Graydon
by G. H. Fellinghusen
his atty.

3 Sheets—Sheet 3.

J. W. GRAYDON.

Assignor, by mesne assignments, to THE COAST AND HARBOR DEFENCE COMPANY.

SUBMARINE TORPEDO.

No. 10,526. Reissued Sept. 23, 1884.

Witnesses.
Joseph Sullivan
John E. Elmendorf

Inventor.
James W. Graydon
by G. W. Fielding Dumpson
his atty.

UNITED STATES PATENT OFFICE.

JAMES W. GRAYDON, OF NEWPORT, RHODE ISLAND, ASSIGNOR, BY MESNE ASSIGNMENTS, TO THE COAST AND HARBOR DEFENCE COMPANY, OF NEW YORK.

SUBMARINE TORPEDO.

SPECIFICATION forming part of Reissued Letters Patent No. 10,526, dated September 23, 1884.

Original No. 270,950, dated January 23, 1883. Application for reissue filed April 25, 1884.

*To all whom it may concern:*

Be it known that I, JAMES W. GRAYDON, of Newport, in the county of Newport, and the State of Rhode Island, have invented a new and useful Improvement in Movable Torpedoes; and I do hereby declare that the following is a full and exact description of the same, reference being had to the accompanying drawings, in which like parts are represented by like letters.

My invention relates to the defensive and offensive use of torpedoes on coasts and in harbors.

The objects of my invention are to provide an apparatus for sending out torpedoes under the surface of the water to attack and destroy hostile fleets upon approach to the coast or entrances to harbors.

The objects of my invention are, further, to retain complete control of the torpedoes, to advance or withdraw them at pleasure, in order to allow our own or friendly vessels to approach, to keep them moving or stationary to intercept hostile fleets, and to surround and destroy them, to explode the torpedoes at will, or upon contact individually or in groups, or the whole simultaneously. In fact, the object of my invention is to maneuver fleets of torpedoes underneath the surface of the water.

My invention consists of an apparatus of "propelling-lines," wire rope preferably, extending from shore to "suitable sunken moorings" in coast defense, situated at proper distances from the coast, having attached to them suitable "leading-blocks" or pulleys, through which the propelling-lines are rove and returned to the shore, where the base of operations is situated. To these propelling-lines are attached, at suitable distances, small leading-lines secured to the torpedoes, which float near the surface of the water. These small leading-lines are provided with suitable clamps for attaching and detaching to and from the propelling-lines as the latter go out or return to the base of operations.

It further consists of a suitable motive power, preferably steam, situated at the base of operations, under bomb-proof, by means of which the propelling-lines are made to move from shore to shore, or from shore out to the sunken moorings.

It further consists of suitable apparatus, electrical or other, for firing the torpedoes individually or in groups, or the whole simultaneously, or upon contact. If an electrical apparatus, the wires to lead along and be attached to the propelling-lines, or situated in the center or core of the propelling-lines, with connecting-wires to each torpedo having electrical fuses suitably situated therein.

Having set forth the objects and purposes of my invention, I will proceed to fully describe its operations, having reference to the accompanying drawings, in which—

Figure 1 is a vertical cross-section of the entrance to the Chesapeake Bay, showing the capes on the right and left, the water-lines W W, the bottom line, D D, together with the apparatus, consisting of the single propelling-line A A, the leading-lines V V, the torpedoes T T, and the bases of operation B B at the capes, the small steam-engines M M furnishing the motive power under bomb-proof P P.

Fig. 2 is a vertical cross-section of the entrance to Mobile Bay, showing Fort Morgan on the right and the shore-line on the left, the water-line W W, the bottom line, D D, together with the apparatus, consisting of the double propelling-line A A, which crosses from Fort Morgan to the opposite shore, reeving around a drum or leading-block, X, and then returning to the base of operations in the fort to the small steam-engine M, the leading lines V V, and the torpedoes T T.

Figure 1:
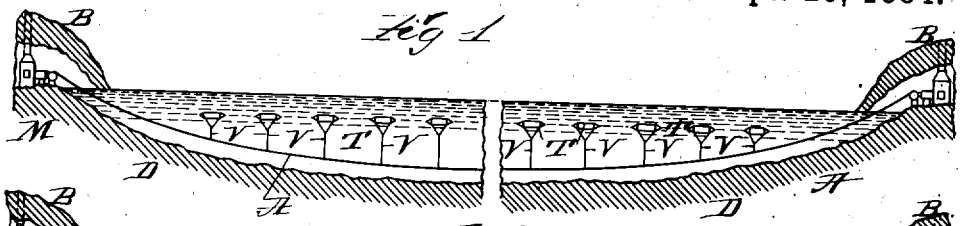
Figure 2:
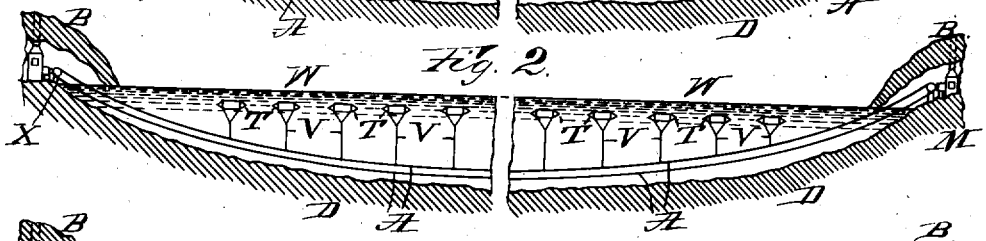
Figure 3:
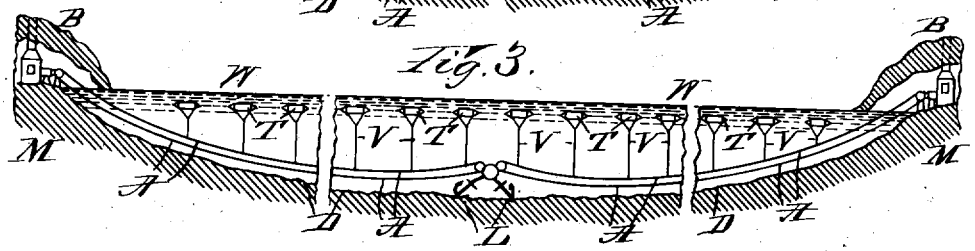
Fig. 3 is a vertical cross-section of a wide entrance to a harbor, showing the bases of operation B B, the water-line W W, the bottom line, D D, together with the apparatus, consisting of the sunken moorings L, the double propelling-lines A A A A, the leading-lines V V, the torpedoes T T, and the steam-engines M M, situated at the base of operations B B.
Figure 4:
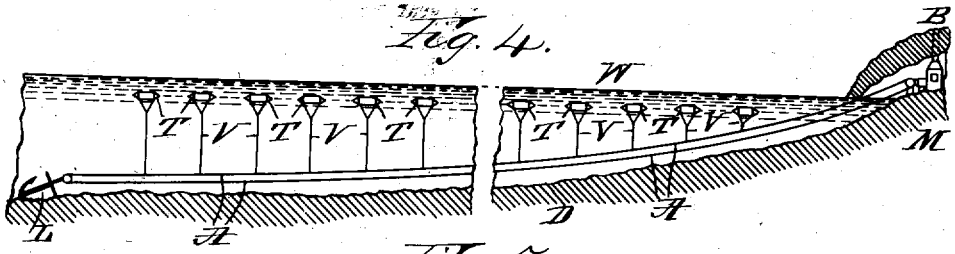
Fig. 4 is a vertical section at right angles to the coast-line at San Francisco, California, showing the coast-line on the right, the sunken moorings L, the double propelling-line A A, the leading-lines V V, the torpedoes T T, and the steam-engine M, situated at the base of operations B.
Figure 5:
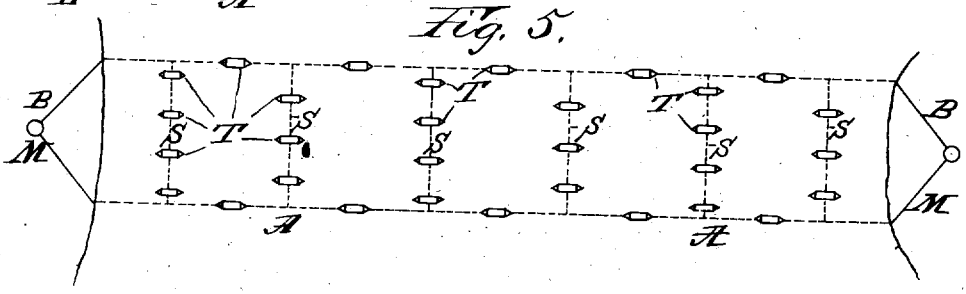

Fig. 5 is a horizontal section or plan of the entrance to the Chesapeake Bay, showing the capes on the right and left, the two single propelling-lines A A A A, with detachable spanning-lines S S S S, suitably buoyant to lift clear of the bottom, and by which the torpedoes T T T T are attached to the leading-lines, as in the other figures, thus with two propelling-lines enabling the operators to control a large expanse of water.

Figure 6:
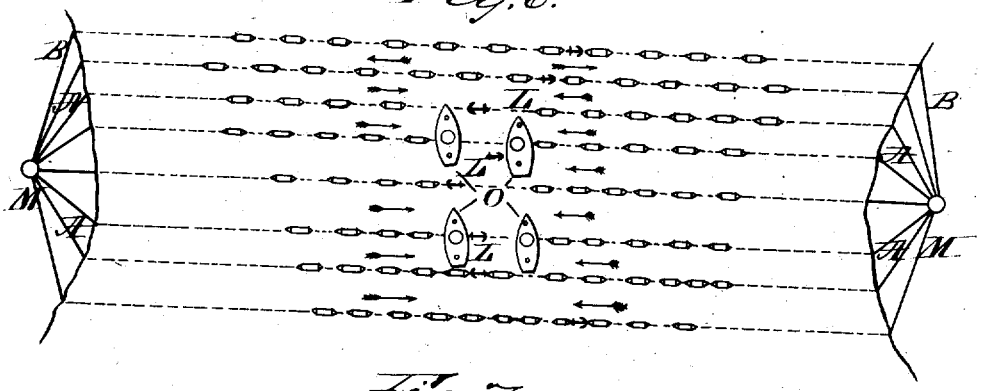

Fig. 6 is a plan or top view of the entrance to the Chesapeake Bay, showing the capes on the right and left, together with the positions of a number of propelling-lines leading to sunken moorings L L in the center, which break joints with each other, the torpedoes T T, a hostile fleet, O O, entering, which is being surrounded by torpedoes preparatory to its destruction, the bases of operations B B, with the propelling-lines A A A A, leading to the steam-engines M M.

Figure 7:
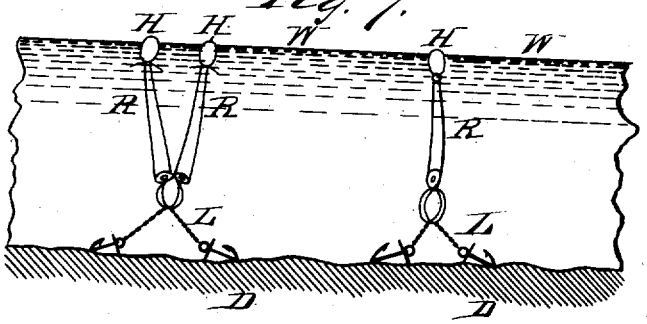

Fig. 7 is a vertical section showing positions of sunken moorings L L, water-line W W, the bottom line, D D, and reeving-lines R R R attached to buoys H H H.

Figure 8:
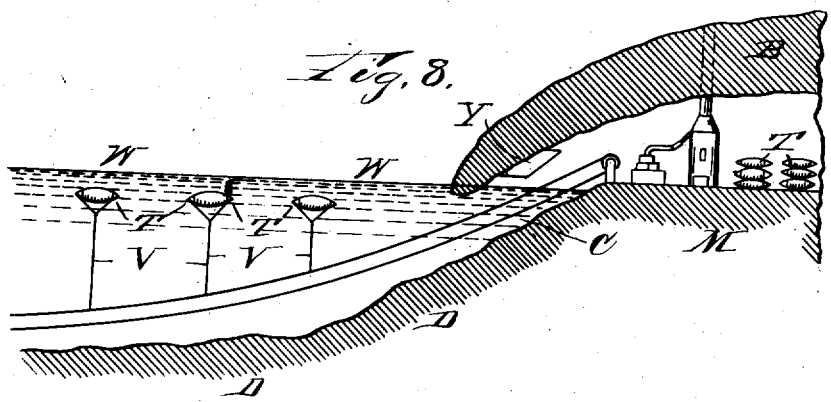

Fig. 8 is a vertical section through the base of operations, showing the water-line W W, the bottom line, D D, the channel C C, through which the propelling-line A A leads to the steam-engine M, the torpedoes T T T, the leading-lines V V, and the position Y, where the leading-lines are attached and detached.

Figure 9:
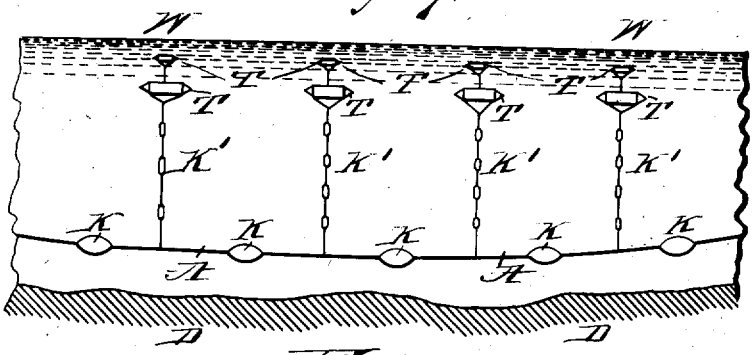

Fig. 9 is a vertical section showing the water-line W W, the bottom line D D, the propelling-line A A, made buoyant by the buoys K K, the leading-lines V V, also made buoyant by the small buoys K′ K′, together with the small torpedoes T T above, and attached to the larger ones T T, which can be used for the destruction of boats sent in by the enemy to cut the lines.

Figure 10:
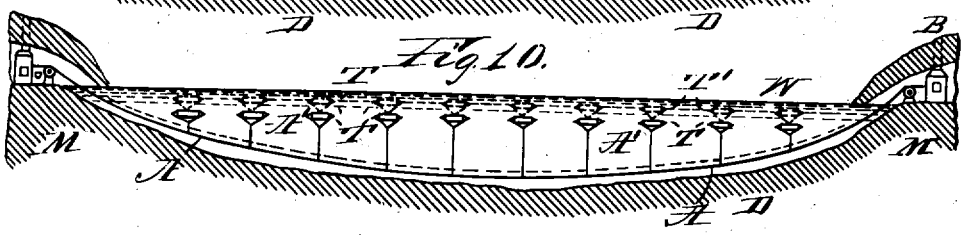

Fig. 10 is a vertical cross-section of an entrance to a harbor, showing water-line W W, the bottom line, D D, the propelling-line A A, the leading-lines V V, the torpedoes T T, depressed by the action of a current, the dotted line A A, showing position of propelling-line when raised by tightening it by the steam-engine, and the position of the torpedoes T T after the propelling-line has been raised.

Figure 11:
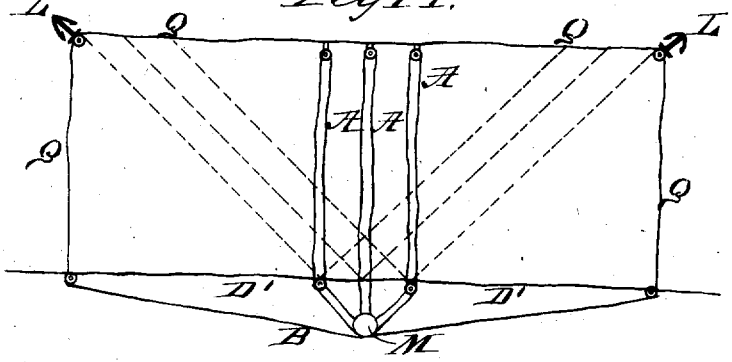

Fig. 11 is a top view or plan of a coast-line, D D, with the adjacent water, showing the sunken moorings L L, through which leads the mooring-line Q Q, returning to the base of operations. To this mooring-line are attached the blocks or pulleys through which lead the propelling-lines A A A. By hauling on the mooring-line on one side and slacking the other side the propelling-lines are made to lead to the right or left, as desired. This enables the operators to control a large expanse of water with but few propelling-lines, the torpedoes being attached to the propelling-lines, the same as represented in the other figures.

Figure 12:
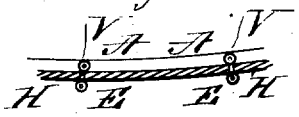

Fig. 12 shows the permanent line H H used as a railroad, together with rollers E E, leading-lines V V, and propelling-line A.

The operation of my invention is as follows: In time of peace the sunken moorings are put in proper positions, with reeving-lines rove and attached to buoys, as in Fig. 7. The apparatus, with the torpedoes, is placed in bomb-proofs at the bases of operations, ready for action. In time of war the propelling-lines are rove off and gotten into position. The apparatus is then in a condition to be operated. Upon the approach of the enemy's vessels the torpedoes are attached, as the lines are run out by the engines, in sufficient numbers and upon as many propelling-lines as may be necessary to defend the coast-line or harbor. After the necessary number are attached to the lines, the torpedoes are then maneuvered in fleets against the enemy, attacking him as soon as in range of the lines, surrounding and destroying his vessels, and as the apparatus with the torpedoes is completely concealed from view of the enemy, and yet the operators have full knowledge always of the exact position of each torpedo, they are enabled to destroy the enemy at pleasure. It will therefore be seen that the torpedoes can be assembled at any given position for a strong attack, can be deployed to intercept an enemy, or the torpedoes withdrawn to allow friendly vessels to approach, and as torpedoes are exploded new ones can be sent out to replace them at will. In fact, with ample steam-power the torpedoes can be handled with the same precision that a body of troops are maneuvered, and with absolute destructive powers.

The drums on the steam-engines being reversible, the propelling-lines can be moved backward and forward, the adjacent lines moving in opposite directions, as indicated in Fig. 6, (number 1 and 2 lines.) The torpedoes are thus constantly changing positions, and the enemy's vessels are sure of destruction upon approach. Upon the approach of friendly vessels the torpedoes are sufficiently run in to enable said vessels to pass in unharmed, and if chased by the enemy he can be intercepted, surrounded, and destroyed, as shown in Fig. 6.

By attaching large submarine mines to the propelling-lines you can transport them under the enemy's vessels within range, and the positions of the mines will be determined accurately by the marks on the propelling-lines.

The operation of the spanning-lines S S S S in Fig. 5 is clearly indicated by the drawings.

In running the torpedoes in for examination, or for other purposes, the torpedoes are detached from the propelling-lines by unclamping the leading-lines at the position Y, Fig. 8. The torpedoes are then cared for by hand, and can be taken into the interior of the base of operations through a separate channel, if necessary.

To provide for the actions of currents, and to overcome the tendency of a strong current to sink the torpedoes too far below the surface of the water, the propelling-lines are raised by tightening them up with the steam-engines in the same proportion that the torpedoes have been depressed by the action of the current, and if, for any other purpose, it is desirable to raise the torpedoes nearer to the surface of the water, it can be done in the same way, and in this connection the buoys K K on the propelling-lines, Fig. 9, are made to assist the engines.

I propose to make the torpedoes float just awash, and the leading-lines cut short for the depth of water which the torpedo is intended to operate in. Then the weight of the lines will sink the torpedoes to the depth required, or the torpedoes can be made to float at a given depth of water, and the leading-lines entirely buoyant, as represented in Fig. 9, K K.

The permanent running-lines H H, Fig. 12, may be used as a railroad on which the leading-lines V V are run, having two small wheels or rollers, E E, one above and the other below the permanent lines H H, and to these rollers are attached light propelling-lines, and by this modification mines and torpedoes can be run out in any number desired.

Where it is necessary to sweep a large expanse of water with torpedoes, two or more lines may be attached to permanent mooring-lines Q Q, Fig. 11, which lead through sunken moorings L L, and the direction to which the propelling-lines A A lead may be changed by the movement of the mooring-line Q Q, Fig. 11.

What I claim as new, and desire to secure by Letters Patent, is—

1. A submarine-torpedo apparatus consisting, essentially, of propelling-lines, as A A, carrying torpedoes, and connected by spanning-lines S S, the whole being arranged for operation under the surface of the water, substantially as described.

2. The submarine-torpedo apparatus consisting of the propelling-lines, as A A, and the spanning-lines, as S S, the latter bearing torpedoes, and arranged for operation by suitable mechanism, substantially as set forth.

JAMES W. GRAYDON.

Witnesses:
PHILIP F. LARNER,
HOWELL BARTLE.